US011130493B2

(12) United States Patent
Jhang et al.

(10) Patent No.: US 11,130,493 B2
(45) Date of Patent: Sep. 28, 2021

(54) TRAJECTORY PLANNING METHOD FOR LANE CHANGING, AND DRIVER ASSISTANCE SYSTEM FOR IMPLEMENTING THE SAME (71) Applicant: Automotive Research & Testing Center, Lugong (TW)

(72) Inventors: Tong-Kai Jhang, Lugong (TW); Chien-Hung Yu, Lugong (TW); Jin-Yan Hsu, Lugong (TW); Kun-Lung Ku, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 157 days.

(21) Appl. No.: 16/729,895

(22) Filed: Dec. 30, 2019

(65) Prior Publication Data
US 2021/0197822 A1 Jul. 1, 2021

(51) Int. Cl.
*B60W 30/18* (2012.01)
*B60W 40/107* (2012.01)
*G06K 9/00* (2006.01)
*G05D 1/08* (2006.01)
*G05D 1/02* (2020.01)
*B60W 40/109* (2012.01)

(52) U.S. Cl.
CPC .... *B60W 30/18163* (2013.01); *B60W 40/107* (2013.01); *B60W 40/109* (2013.01); *G05D 1/027* (2013.01); *G05D 1/0891* (2013.01); *G06K 9/00798* (2013.01)

(58) Field of Classification Search
CPC ........ B60W 30/18163; B60W 40/107; B60W 40/109; G05D 1/027; G05D 1/0891; G06K 9/00798
USPC ........................................................... 701/23
See application file for complete search history.

(56) References Cited

U.S. PATENT DOCUMENTS

| 10,807,608 | B2* | 10/2020 | Nishiguchi | ........ B62D 15/0255 |
| 2018/0201318 | A1* | 7/2018 | Kataoka | ............... B62D 15/025 |
| 2018/0290686 | A1* | 10/2018 | Minoiu Enache | .... B60W 30/09 |
| 2019/0071094 | A1* | 3/2019 | Nishiguchi | ........ B62D 15/0255 |
| 2019/0084619 | A1* | 3/2019 | Mizoguchi | ......... B62D 15/0255 |
| 2019/0154439 | A1* | 5/2019 | Binder | .................... G01S 15/08 |

(Continued)

FOREIGN PATENT DOCUMENTS

| CN | 107264531 A | 10/2017 |
| CN | 107672592 A | 2/2018 |

(Continued)

*Primary Examiner* — Yazan A Soofi
(74) *Attorney, Agent, or Firm* — Birch, Stewart, Kolasch & Birch, LLP (57) ABSTRACT A trajectory planning method for lane changing of a vehicle includes steps of: calculating a current position of a reference point of the vehicle on a preliminary lane change trajectory that is received from an LCA system of the vehicle at a current time point; based on kinematics data received from an IMU of the vehicle, calculating longitudinal and lateral displacements of the reference point moving during a unit of time from the current time point to a next time point, and a yaw angle of the vehicle at the next time point; and obtaining a calibrated lane change trajectory based on the preliminary lane change trajectory, the current position, the longitudinal and lateral displacements, and the yaw angle.

10 Claims, 7 Drawing Sheets (56) References Cited

U.S. PATENT DOCUMENTS

2020/0241563 A1* 7/2020 Van Der Knaap ....... G08G 1/22
2021/0107510 A1* 4/2021 Kato .................... B60W 10/20

FOREIGN PATENT DOCUMENTS

CN        108829110 A   11/2018
WO   WO 2012/160591 A1   11/2012

* cited by examiner

TRAJECTORY PLANNING METHOD FOR LANE CHANGING, AND DRIVER ASSISTANCE SYSTEM FOR IMPLEMENTING THE SAME

FIELD

The disclosure relates to a trajectory planning method for lane changing and a driver assistance system.

BACKGROUND

An advanced driver-assistance system (ADAS) is a system developed to enhance safety and driving experience of a vehicle (e.g., an automobile), and may include one or more of, for example, an auto-emergency braking (AEB) system, an adaptive cruise control (ACC) system, a lane following system (LFS), a forward collision warning (FCW) system, a lane departure warning (LDW) system, a blind spot detection (BSD) system, a rear cross traffic alert (RCTA) system, a lane keeping assist system (LKAS) system, etc.

Specifically, the LKAS system or the LFS may, when the vehicle begins to drift away from being centered at a center line of the lane on which the vehicle is running, nudge the vehicle back to being centered at the center line of the lane so as to correct steering of the vehicle. It is noted that, when the vehicle moves across to an adjacent lane, i.e. changing lanes, the LKAS system or the LFS will be temporarily inactivated.

On the other hand, when a turn signal of the vehicle is activated, a newly-developed lane change assist (LCA) system may be triggered to plan a lane-changing trajectory to an adjacent lane based on data monitored by sensors of the vehicle. Some advanced LCA systems may further control the vehicle to steer according to the lane-changing trajectory automatically. Furthermore, the lane-changing trajectory should be planned to be followed by a center line of the adjacent lane, and then the LCA system will be inactivated and the LKAS system or the LFS will be activated when the end point of the lane-changing trajectory is reached.

However, the vehicle may be unable to follow the planned lane-changing trajectory because of various external factors, e.g. wind, rain, and road conditions that are not monitored. Accordingly, sometimes, jerks occur the moment the vehicle switches from the (LCA) system to the LKAS system or the LFS.

SUMMARY

Therefore, one object of the disclosure is to provide a trajectory planning method and system for lane changing that can alleviate at least one of the drawbacks of the prior art.

According to one embodiment of the disclosure, a trajectory planning method for lane changing is provided. The trajectory planning method is implemented by a processing unit installed on a vehicle. The vehicle is provided with a lane detection module for obtaining lane-line data that relates to lane lines of a road on which the vehicle is running, an inertial measurement unit (IMU) for obtaining kinematics data that relates to motion of the vehicle, and a lane change assist (LCA) system for generating a preliminary lane change trajectory.

The trajectory planning method includes steps of:
at a current time point, receiving the preliminary lane change trajectory from the LCA system, the lane-line data from the lane detection module, and the kinematics data from the IMU;
calculating a current position of a reference point of the vehicle on the preliminary lane change trajectory at the current time point based on the lane-line data received at the current time point;
based on the kinematics data received at the current time, calculating a longitudinal displacement and a lateral displacement of the reference point of the vehicle moving during a unit of time from the current time point to a next time point, and a yaw angle of the vehicle at the next time point; and
obtaining a calibrated lane change trajectory based on the preliminary lane change trajectory, the current position, the longitudinal displacement, the lateral displacement and the yaw angle, wherein the calibrated lane change trajectory starts from an estimated position, at which the reference point of the vehicle is estimated to be located the next time point.

Another object of the disclosure is to provide a driver assistance system for lane changing and a method implemented by the driver assistance system.

According to one embodiment of the disclosure, the driver assistance system includes a lane detection module, an inertial measurement unit (IMU), a lane change assist (LCA) system, and a processing unit installed on a vehicle. The method includes steps of:
obtaining, by the lane detection module, lane-line data that relates to lane lines of a road on which the vehicle is running;
obtaining, by an inertial measurement unit (IMU), kinematics data that relates to motion of the vehicle;
generating, by the lane change assist (LCA) system, a preliminary lane change trajectory;
at a current time point, receiving, by the processing unit, the preliminary lane change trajectory from the LCA system, the lane-line data from the lane detection module, and the kinematics data from the IMU;
calculating a current position of a reference point of the vehicle on the preliminary lane change trajectory at the current time point based on the lane-line data received at the current time point;
based on the kinematics data received at the current time, calculating a longitudinal displacement and a lateral displacement of the reference point of the vehicle moving during a unit of time from the current time point to a next time point, and a yaw angle of the vehicle at the next time point; and
obtaining a calibrated lane change trajectory based on the preliminary lane change trajectory, the current position, the longitudinal displacement, the lateral displacement and the yaw angle, wherein the calibrated lane change trajectory starts form an estimated position, at which the reference point of the vehicle is estimated to be located the next time point.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "electrically connect" may refer to a connection between two or more electronic equipments, devices or components via an electrically conductive material (which may be referred to as a direct electric connection), a connection between two or more electronic equipments, devices or components via another one or more electronic equipments, devices or components (which may be referred to as an indirect electric connection), or connection between two or more electronic equipments, devices or components using wireless technology.

Figure 1:
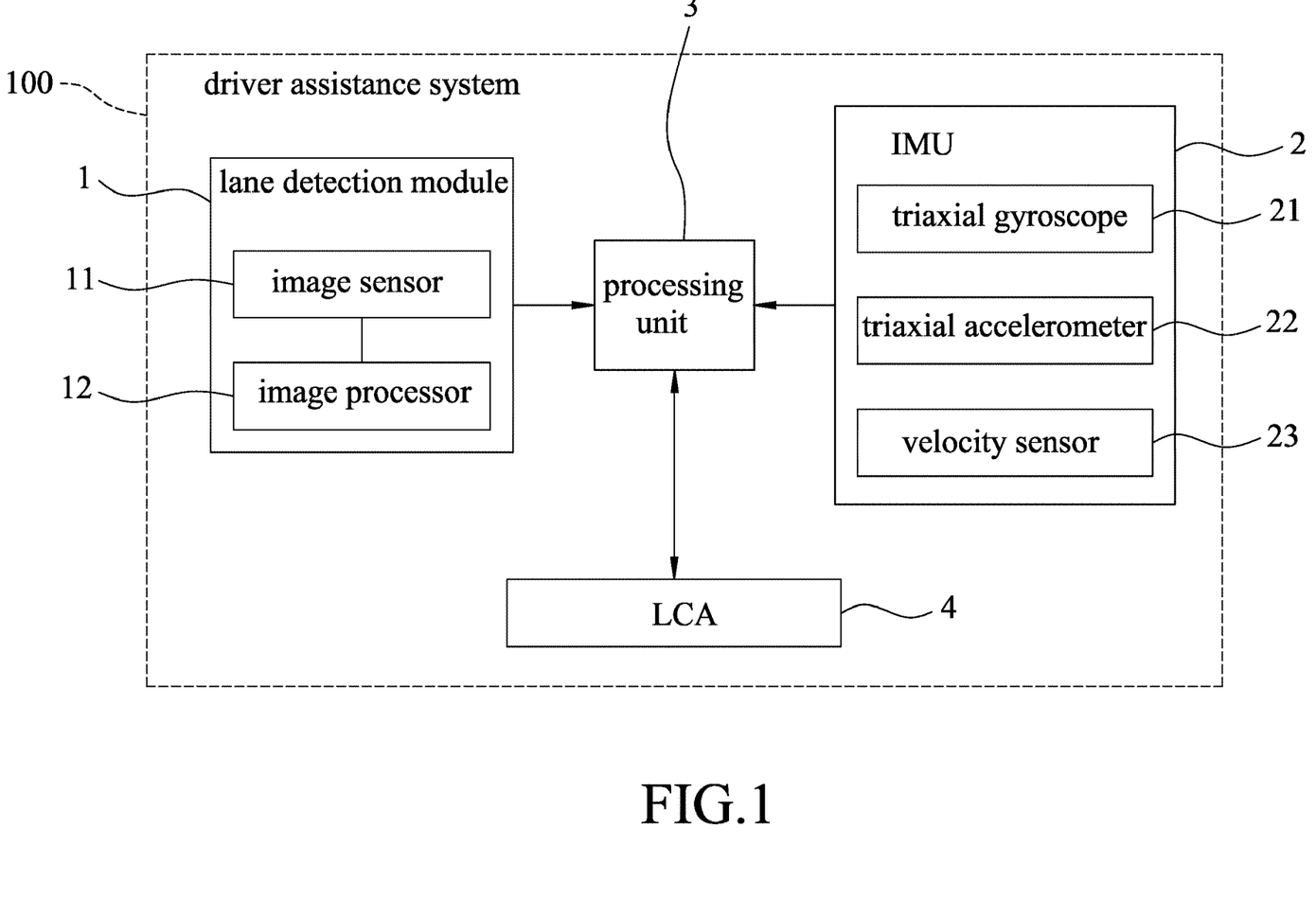
FIG. 1 is a block diagram illustrating a driver assistance system according to an embodiment of the disclosure.
Figure 2:
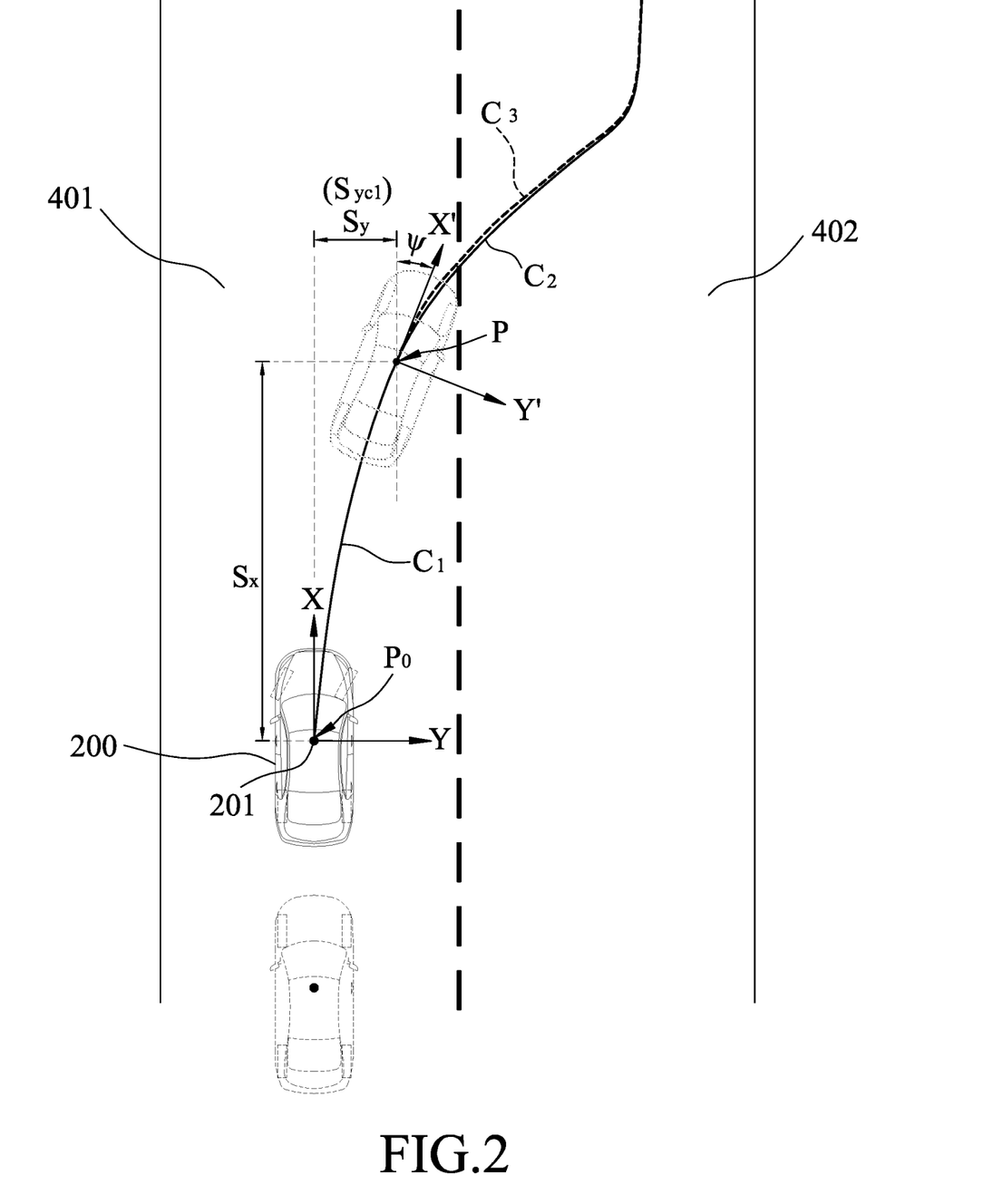
FIG. 2 is a schematic diagram illustrating an example of a vehicle changing lanes.

Referring to FIGS. 1 and 2, an embodiment of a driver assistance system 100 according to this disclosure is installed on a vehicle 200, and includes a lane detection module 1, an inertial measurement unit (IMU) 2, a lane change assist (LCA) system 4, and a processing unit 3 electronically connected to the lane detection module 1, the IMU 2 and the LCA system 4. For example, the processing unit 3 is an in-vehicle computer.

The lane detection module 1 includes an image sensor 11 mounted at, for example, a top of a windshield of the vehicle 200, and an image processor 12 electronically connected to the image sensor 11. For example, the image sensor is a CCD (charge-coupled device) image sensor. The image sensor 11 constantly captures images of a road which the vehicle 200 is running on at a frame rate of 10 frames per sec, for example. The image processor 12 receives the images, implements a known algorithm to obtain lane-line data that relates to lane lines of the road, and outputs the lane-line data to the processing unit 3 in real time, where "lane lines" refer to lines on the road, such as a single broken white line, or double yellow lines, that are used to delineate lanes. The lane-line data may include a left-lane-line equation used to express a left lane line of the (current) lane, and a right-lane-line equation used to express a right lane line of the (current) lane in some embodiments.

In some embodiments, the image processor 12 is integrated in a system on a chip that further includes a video processor, a digital signal processor (DSP) and a 32-bit microcontroller controlling the chip. In some embodiments, the image processor 12 is an image processing engine, image processing unit (IPU) or image signal processor (ISP), and may include, but not limited to, a single core processor, a multi-core processor, a dual-core mobile processor, a microprocessor, a microcontroller, and/or a digital signal processor (DSP), etc.

The IMU 2 includes, for example but not limited to, a triaxial gyroscope 21, a triaxial accelerometer 22 and a velocity sensor 23 for obtaining kinematics data that relates to motion of the vehicle 200. The IMU 2 outputs the kinematics data to the processing unit 3 in real time. The kinematics data, for example, includes angular velocity data, acceleration data and linear velocity data indicating angular velocity, acceleration and linear velocity of the vehicle 200, respectively.

In this embodiment, an output rate of the lane detection module 1 is designed to be 10 outputs per second, while an output rate of the IMU 2 is designated to be equal to a reciprocal of a unit of time $\Delta t$. For example, the unit of time may be 10 ms, and the output rate of the IMU 2 is 100 outputs per second, which is tenfold that of the lane detection module 1. In this disclosure, the term "output rate" indicates a number of pieces of data outputted within a unit of time.

The LCA system 4 is configured to generate a preliminary lane change trajectory $C_1$, for example, when a turn signal (not shown) of the vehicle 200 is activated. The LCA system 4 may utilize, e.g., radar sensors (not shown), to monitor the blind-spot area and the traffic situation, and plan the preliminary lane change trajectory $C_1$ accordingly. The LCA system 4 may further provide automatic steering control instructions to an engine system (not shown) and a steering system (not shown) of the vehicle 200, such that the engine system and the steering wheel system cooperate to control the vehicle 200 to move, e.g., from an original lane 401 to an adjacent lane 402, according to the preliminary lane change trajectory $C_1$ in response to the steering control instructions (see FIG. 2).

Figure 3:
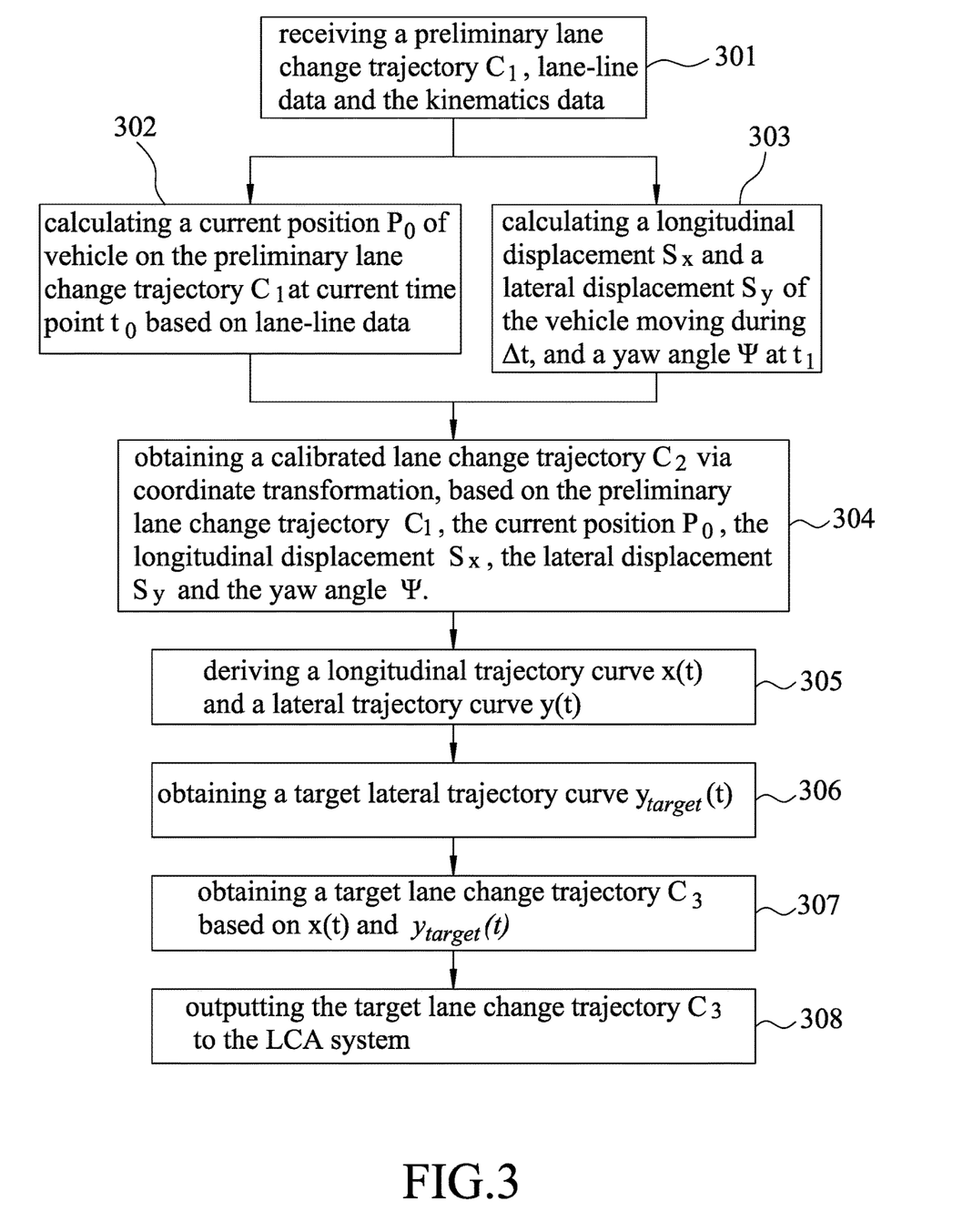
FIG. 3 is a flow chart exemplarily illustrating a trajectory planning method for lane changing according to an embodiment of the disclosure.

Referring to FIG. 3, a trajectory planning method 300 for lane changing is provided according to an embodiment of this disclosure. During performance of the trajectory planning method 300, the lane detection module 1 constantly obtains the lane-line data, the IMU 2 constantly obtains the kinematics data related to motion of the vehicle 200, and the LCA system 4 generates the preliminary lane change trajectory $C_1$ at a current time point $t_0$ (e.g., a time point when the turn signal is activated). The trajectory planning method 300 further includes steps 301 to 308 described as follows.

In step 301, the processing unit 3 receives, at the current time point $t_0$, the preliminary lane change trajectory $C_1$ from the LCA system 4, the lane-line data from the lane detection module 1, and the kinematics data from the IMU 2. It should be noted that, although the processing unit 3 only considers the lane-line data and the kinematics data that are received respectively from the lane detection module 1 and the IMU 2 at the current time point $t_0$ for subsequent calculations in the trajectory planning method 300, the lane detection module 1 and the IMU 2 may constantly output the lane-line data and the kinematics data to be used by other systems of the vehicle 200.

In step 302, the processing unit 3 calculates a current position $P_0$ of a reference point 201 of the vehicle 200 on the preliminary lane change trajectory $C_1$ at the current time point $t_0$ based on the lane-line data received at the current time point $t_0$. For example, the reference point 201 of the vehicle 200 is a center of gravity of the vehicle 200.

In step 303, based on the kinematics data received at the current time $t_0$, the processing unit 3 calculates a longitudinal displacement $S_x$ and a lateral displacement $S_y$ of the reference point 201 of the vehicle 200 moving during the unit of time $\Delta t$ (e.g., 10 ms) from the current time point $t_0$ to a next time point $t_1$, and a yaw angle $\psi$ of the vehicle 200 at the next time point $t_1$.

Specifically, step 303 includes sub-steps of: smoothing out noises of the angular velocity data and the acceleration data included in the kinematics data using Kalman filtering process; estimating a yaw rate and a lateral acceleration value based on the smoothed angular velocity data and the smoothed acceleration data by means of Kalman estimations; estimating the lateral displacement $S_y$ and the yaw angle $\psi$ based on the yaw rate, the lateral acceleration value and the unit of time $\Delta t$; and estimating the longitudinal displacement $S_x$ based on the linear velocity data included in the kinematics data, the yaw angle $\psi$ and the unit of time $\Delta t$.

It should be noted that step 302 and step 303 may be implemented in an arbitrary sequence or implemented in parallel.

In step 304, the processing unit 3 obtains a calibrated lane change trajectory $C_2$ via coordinate transformation, based on the preliminary lane change trajectory $C_1$, the current position $P_0$, the longitudinal displacement $S_x$, the lateral displacement $S_y$, and the yaw angle $\psi$. The calibrated lane change trajectory $C_2$ starts from an estimated position $P_1$ that can be calculated based on the current position $P_0$, the longitudinal displacement $S_x$, and the lateral displacement $S_y$. It should be noted that the reference point 201 of the vehicle 200 is estimated to be at the estimated position $P_1$ at the next time point $t_1$.

In a case that the vehicle 200 moves exactly along the preliminary lane change trajectory $C_1$, the lateral displacement $S_y$ estimated in step 303 will be close or equal to a preliminary lateral displacement $S_{yc1}$ of the reference point 201 of the vehicle 200 moving along the preliminary lane change trajectory $C_1$ during the unit of time $\Delta t$ from the current time point $t_0$ to the next time point $t_1$. In other words, the estimated position $P_1$ calculated would be very close to or exactly on the preliminary lane change trajectory $C_1$, as shown in FIG. 2. The calibrated lane change trajectory $C_2$ obtained in this step would be mostly overlapping with the preliminary lane change trajectory $C_1$.

Figure 4:
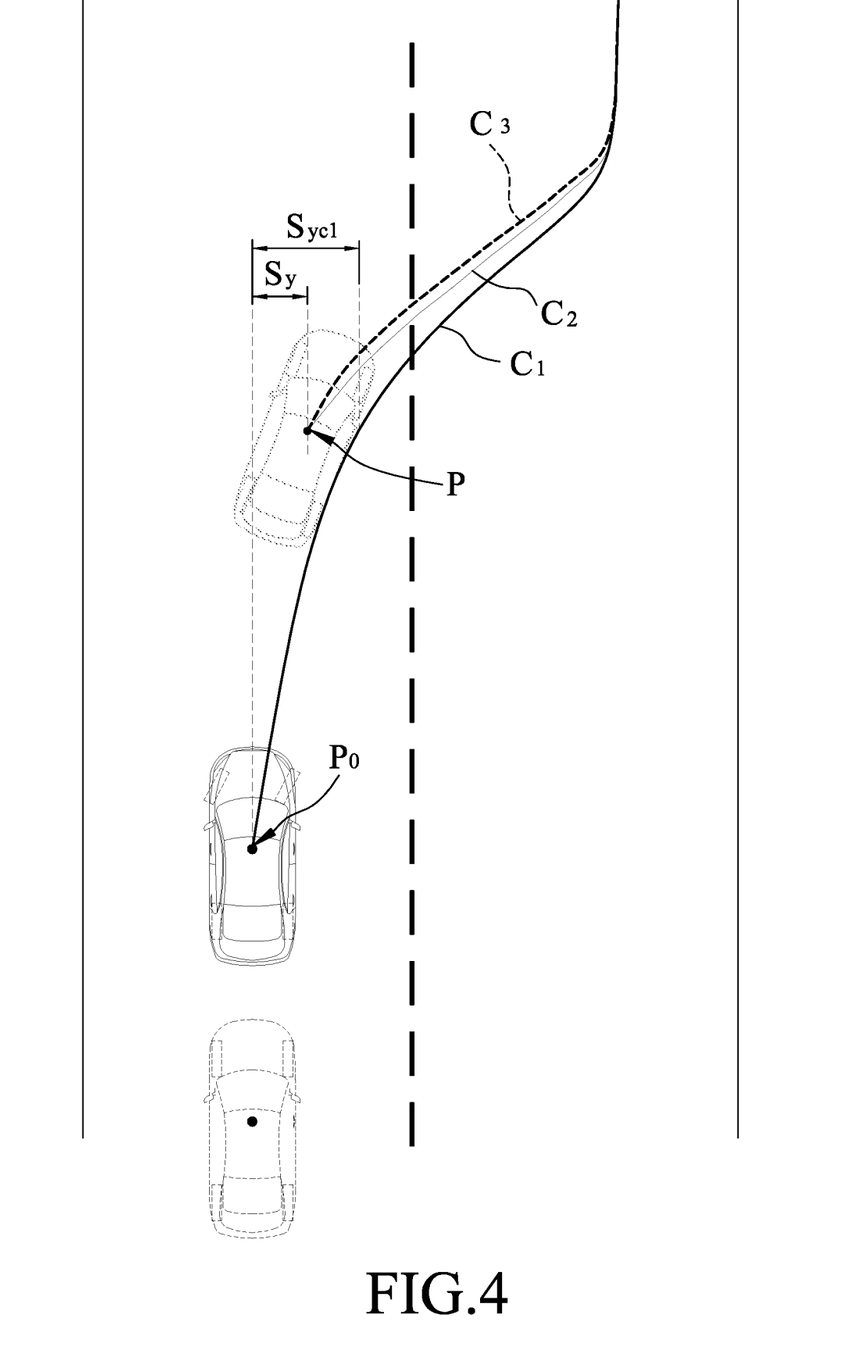
FIG. 4 is a schematic diagram illustrating another example of a vehicle changing lanes.

On the other hand, in the case that unexpected external factors affect the motion of the vehicle 200, so the vehicle 200 does not move exactly along the preliminary lane change trajectory $C_1$, the lateral displacement $S_y$ estimated in step 303 will be less or greater than the preliminary lateral displacement $S_{yc1}$ during the unit of time $\Delta t$ from the current time point $t_0$ to the next time point $t_1$. In other words, the estimated position $P_1$ calculated would depart from the preliminary lane change trajectory $C_1$, as shown in FIG. 4. Therefore, the calibrated lane change trajectory $C_2$ obtained in this step would be totally different from the preliminary lane change trajectory $C_1$.

To obtain the calibrated lane change trajectory $C_2$ a relation of a coordinate system x'-y' defined in relation to the estimated position $P_1$ (and orientation of the vehicle 200 at the estimated position $P_1$) and another coordinate system x-y defined in relation to the current position $P_0$ (and orientation of the vehicle 200 at the current position $P_0$) may be expressed by a matrix equation (1).

$$\begin{bmatrix} x' \\ y' \end{bmatrix} = \begin{bmatrix} \cos\psi & \sin\psi \\ -\sin\psi & \cos\psi \end{bmatrix} \begin{bmatrix} x - S_x \\ y - S_y \end{bmatrix} \tag{1}$$

Then, the matrix equation (1) is processed by coordinate transformation to become an inverse transformation matrix equation (2).

$$\begin{bmatrix} x \\ y \end{bmatrix} = \begin{bmatrix} \cos\psi & -\sin\psi \\ \sin\psi & \cos\psi \end{bmatrix} \begin{bmatrix} x' \\ y' \end{bmatrix} + \begin{bmatrix} S_x \\ S_y \end{bmatrix} \tag{2}$$

Then, equations of the calibrated lane change trajectory $C_2$ may be obtained from the matrix equation (2) and is presented as x=g(x', y') and y=h(x', y').

Let the preliminary lane change trajectory $C_1$ be represented as a cubic curve equation:

$C_1: y_1 = f_1(x) = a_1 x^3 + b_1 x^2 + c_1 x + d_1$, wherein $a_1$, $b_1$, $c_1$ are coefficients of the function $f_1(x)$.

The calibrated lane change trajectory $C_2$ could be represented by:

$$C_2: h(x',y') = f_2(g(x',y')) = a_2 x'^3 + b_2 x'^2 + c_2 x' + d_2 \tag{3}$$

wherein $a_2, b_2, c_2$ are coefficients of the function $f_2(x)$.

In some embodiments, the calibrated lane change trajectory $C_2$ is outputted to the LCA system 4 for controlling lane change of the vehicle 200. The LCA system 4 may provide automatic steering control instructions to control the vehicle 200 to move according to the calibrated lane change trajectory $C_2$. In some embodiments, the calibrated lane change trajectory $C_2$ is not outputted and is further modified as follows.

Figure 6:
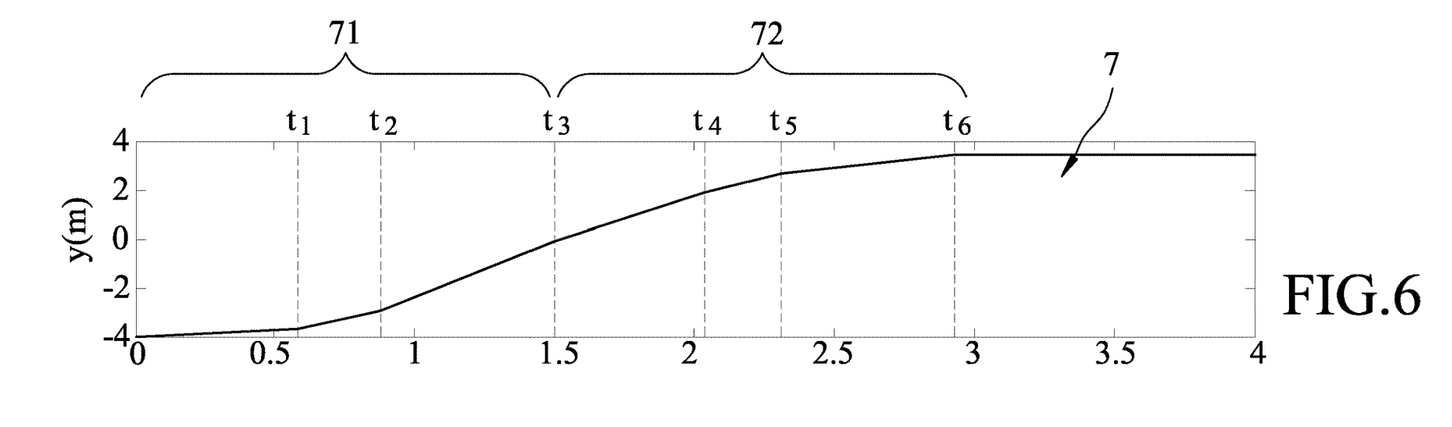
FIG. 6 illustrates an exemplary lateral trajectory curve of the vehicle.

In step 305, the processing unit 3 derives a longitudinal trajectory curve x(t) and a lateral trajectory curve y(t) from Equation (3). The lateral trajectory curve y(t) is illustrated in FIG. 6.

In step 306, the processing unit 3 obtains a target lateral trajectory curve $y_{target}(t)$.

Figure 5:
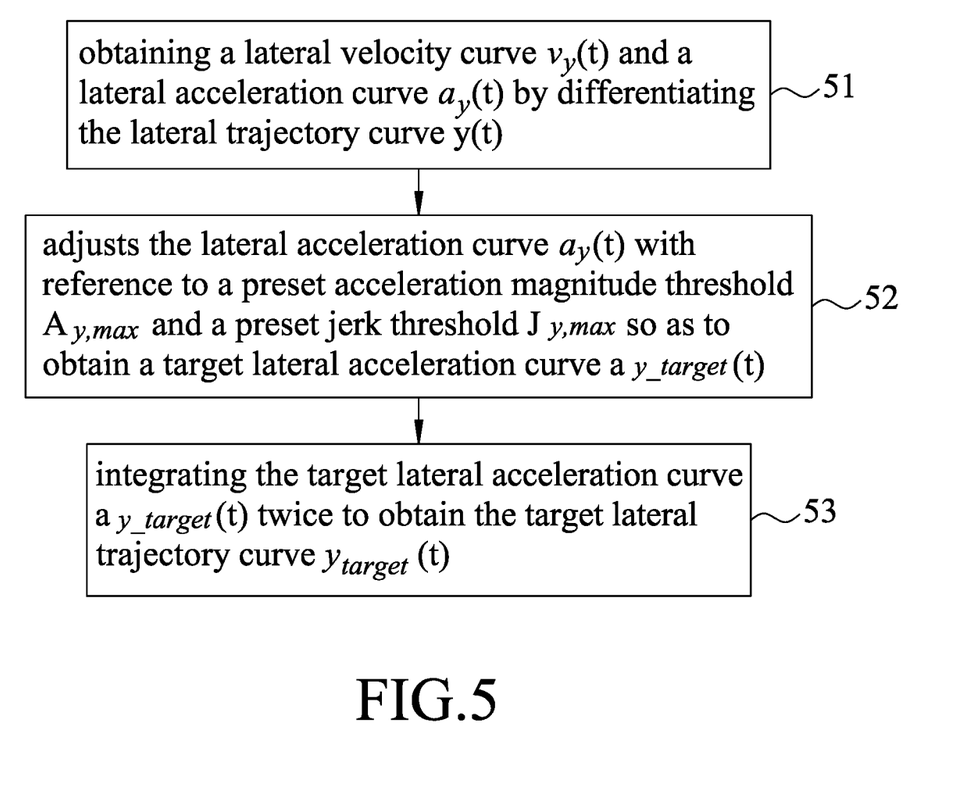
FIG. 5 is a flow chart illustrating sub-steps of a step of obtaining a target lateral trajectory curve of the trajectory planning method illustrated in FIG. 3.

Referring to FIG. 5, the step 306 includes sub-steps 51 to 53.

In step 51, the processing unit 3 obtains a lateral velocity curve $v_y(t)$ and a lateral acceleration curve $a_y(t)$ by differentiating the lateral trajectory curve y(t). The lateral acceleration curve $a_y(t)$ is a sine wave curve having a positive half cycle, and a negative half cycle following and connected to the positive half cycle.

In step 52, the processing unit 3 adjusts the lateral acceleration curve $a_y(t)$ with reference to a preset acceleration magnitude threshold $A_{y,max}$ and a preset jerk magnitude threshold $J_{y,max}$ so as to obtain a target lateral acceleration curve $a_{y\_target}(t)$. Specifically, the processing unit 3 adjusts the lateral acceleration curve $a_y(t)$ in a manner that a maximum value of the positive half cycle is not greater than a positive preset acceleration threshold which is the preset acceleration magnitude threshold with a positive sign (i.e., $+A_{y,max}$), and a minimum value of the negative half cycle is not smaller than a negative preset acceleration threshold which is the preset acceleration magnitude threshold with a negative sign (i.e., $-A_{y,max}$).

Figure 7:
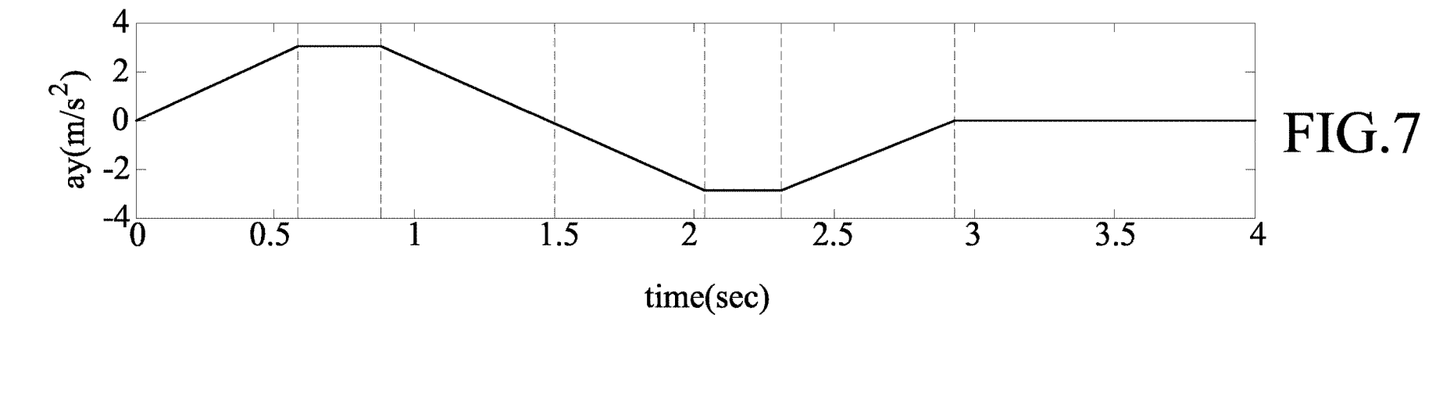
FIG. 7 illustrates an exemplary trapezoidal acceleration profile.

Further referring to FIG. 7, in this embodiment, the processing unit 3 may adjust the lateral acceleration curve $a_y(t)$ with reference to a trapezoidal acceleration profile 7 that consists of a positive trapezoidal segment 71 having positive acceleration values and a negative trapezoidal segment 72 having negative acceleration values. The positive and negative trapezoidal segments 71, 72 are connected to each other to form a continuous waveform and have a same shape and size that is related to the preset acceleration magnitude threshold $A_{y,max}$ and the preset jerk magnitude threshold $J_{y,max}$. In some embodiments, the processing unit 3 adjusts the lateral acceleration curve $a_y(t)$ in a manner that the positive half cycle of the lateral acceleration curve $a_y(t)$ is within a range covered by the positive trapezoidal segment 71 of the trapezoidal acceleration profile 7, and the negative half cycle of the lateral acceleration curve $a_y(t)$ is within a range covered by the negative trapezoidal segment 72 of the trapezoidal acceleration profile 7.

In this embodiment, the preset acceleration magnitude threshold $A_{y,max}$ is 3 m/s², and the preset jerk magnitude threshold $J_{y,max}$ is 5 m/s³. The trapezoidal acceleration profile 7 has key time points satisfying the following constraints:

$$t_1 = \frac{A_{y,max}}{J_{y,max}};$$

$$t_2 = \frac{-t_1^2 + \sqrt{t_1^4 + 4t_1 \frac{y_{eva}}{J_{y,max}}}}{2t_1};$$

$$t_3 = t_1 + t_2;$$

$$t_4 = 2t_1 + t_2;$$

$$t_5 = t_1 + 2t_2; \text{ and}$$

$$t_6 = 2t_1 + 2t_2,$$

where $y_{eva}$ is defined as a distance between a central line of the original lane 401 and a central line of the adjacent lane 402.

Figure 8:
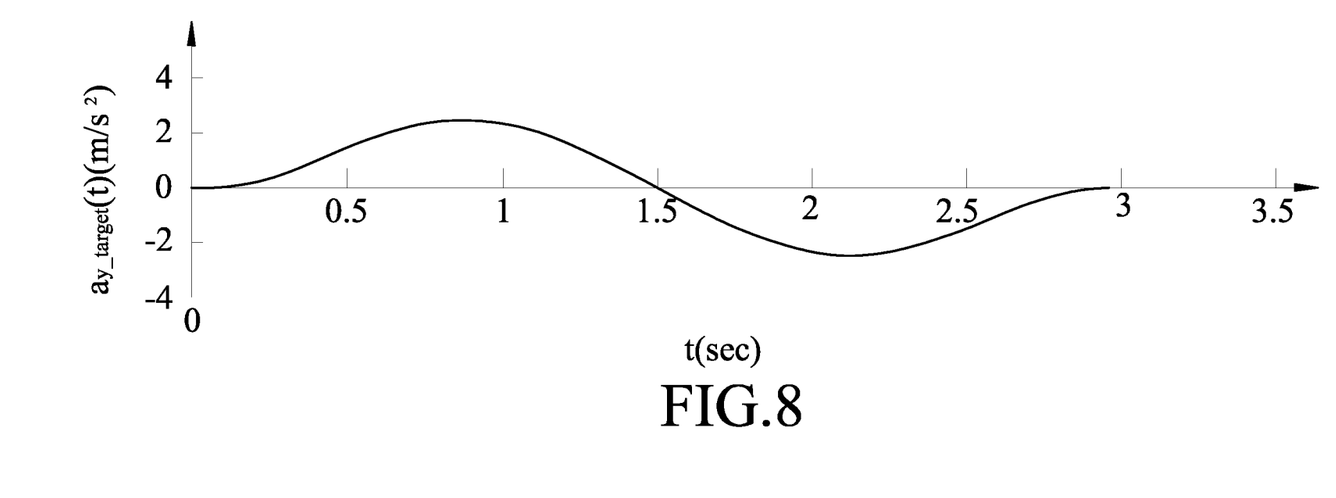
FIG. 8 illustrates an exemplary target lateral acceleration curve.
Figure 9:
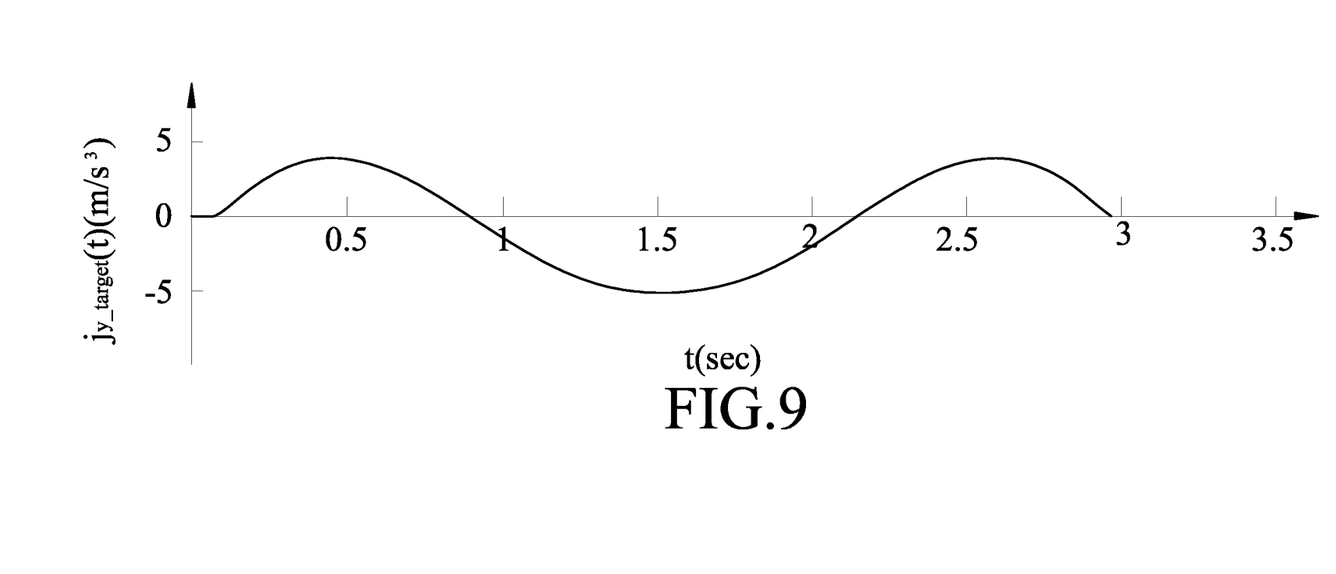
FIG. 9 illustrates an exemplary target lateral jerk curve.

The target lateral acceleration curve $a_{y\_target}(t)$ thus adjusted is illustrated in FIG. 8. On the other hand, a target lateral jerk curve $j_{y\_target}(t)$, illustrated in FIG. 9, is obtained by differentiating the target lateral acceleration curve $a_{y\_target}(t)$. Any value of the target lateral jerk curve $j_{y\_target}(t)$ is within a range between a positive preset jerk threshold which is the preset jerk magnitude threshold with a positive sign (i.e., $+J_{y,max}$), and a negative preset jerk threshold which is the preset jerk magnitude threshold with a negative sign (i.e., $-J_{y,max}$).

In step 53, the processing unit 3 integrates the target lateral acceleration curve $a_{y\_target}(t)$ twice to obtain the target lateral trajectory curve $y_{target}(t)$.

Referring back to FIG. 3, in step 307, the processing unit 3 obtains a target lane change trajectory $C_3$ based on the longitudinal trajectory curve $x(t)$ and the target lateral trajectory curve $y_{target}(t)$.

Finally, in step 308, the processing unit 3 outputs the target lane change trajectory $C_3$ to the LCA system 4 for controlling lane change of the vehicle 200.

It can be appreciated that the driver assistance system 100 of this disclosure provides the calibrated lane change trajectory $C_2$ that reflects the real steering situation, and the target lane change trajectory $C_3$, where a lateral acceleration curve obtained therefrom is within a range of the preset acceleration magnitude threshold $A_{y,max}$ and a lateral jerk curve obtained therefrom is within a range of the preset jerk magnitude threshold $J_{y,max}$. Thus, the vehicle 200 may be controlled to move automatically or semi-automatically with a relatively safe and smooth trajectory according to the calibrated lane change trajectory $C_2$ or the target lane change trajectory $C_3$.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A trajectory planning method for lane changing to be implemented by a processing unit installed on a vehicle, the vehicle being provided with a lane detection module for obtaining lane-line data that relates to lane lines of a road on which the vehicle is running, an inertial measurement unit (IMU) for obtaining kinematics data that relates to motion of the vehicle, and a lane change assist (LCA) system for generating a preliminary lane change trajectory, the trajectory planning method comprising steps of:

at a current time point, receiving the preliminary lane change trajectory from the LCA system, the lane-line data from the lane detection module, and the kinematics data from the IMU;

calculating a current position of a reference point of the vehicle on the preliminary lane change trajectory at the current time point based on the lane-line data received from the lane detection module at the current time point;

based on the kinematics data received from the IMU at the current time, calculating a longitudinal displacement and a lateral displacement of the reference point of the vehicle moving during a unit of time from the current time point to a next time point, and a yaw angle of the vehicle at the next time point; and obtaining a calibrated lane change trajectory based on the preliminary lane change trajectory, the current position, the longitudinal displacement, the lateral displacement and the yaw angle, wherein the calibrated lane change trajectory starts from an estimated position, where the reference point of the vehicle is estimated to be located the next time point.

2. The trajectory planning method of claim 1, wherein the step of obtaining a calibrated lane change trajectory includes:

obtaining a matrix equation that expresses a relation of a coordinate system defined in relation to the estimated position and another coordinate system defined in relation to the current position based the longitudinal displacement, the lateral displacement and the yaw angle; and calculating the calibrated lane change trajectory based on the matrix equation and the preliminary lane change trajectory.

3. The trajectory planning method of claim 1, further comprising, after the step of obtaining a calibrating lane change trajectory, steps of:

deriving a lateral trajectory curve from the calibrating lane change trajectory;

obtaining a lateral acceleration curve based on the lateral trajectory curve;

adjusting the lateral acceleration curve with reference to a preset acceleration magnitude threshold and a preset jerk magnitude threshold so as to obtain a target lateral acceleration curve;

obtaining a target lane change trajectory based on the target lateral acceleration curve; and outputting the target lane change trajectory to the LCA system for controlling automated lane change of the vehicle.

4. The trajectory planning method of claim 3, wherein the step of adjusting the lateral acceleration curve is to adjust the lateral acceleration curve with reference to a trapezoidal acceleration profile that consists of a positive trapezoidal segment having positive acceleration values and a negative trapezoidal segment having negative acceleration values, the positive and negative trapezoidal segments having a same shape and size that is related to the preset acceleration threshold and the preset jerk threshold.

5. The trajectory planning method of claim 4, wherein the lateral acceleration curve is a sine wave curve having a positive half cycle, and a negative half cycle following and connected to the positive half cycle, wherein the step of adjusting the lateral acceleration curve includes:

adjusting the lateral acceleration curve in a manner that a maximum value of the positive half cycle is not greater than a positive preset acceleration threshold and a minimum value of the negative half cycle is not smaller than a negative preset acceleration threshold, wherein the positive preset acceleration threshold is the preset acceleration magnitude threshold with a positive sign, and the negative preset acceleration threshold is the preset acceleration magnitude threshold with a negative sign.

6. The trajectory planning method of claim 4, further comprising:

differentiating the lateral acceleration curve to obtain a lateral jerk curve; and adjusting the lateral jerk curve in a manner that any value of the lateral jerk curve is within a range between a positive preset jerk threshold and a negative preset jerk threshold, wherein the positive preset jerk threshold is the preset jerk magnitude threshold with a positive sign, and the negative preset jerk threshold is the preset jerk magnitude threshold with a negative sign.

7. The trajectory planning method of claim 3, wherein the preset acceleration threshold is 3 m/s$^2$, and the preset jerk threshold is 5 m/s$^3$.

8. The trajectory planning method of claim 3, the kinematics data including linear velocity data, angular velocity data and acceleration data of the vehicle, wherein the step of calculating the longitudinal displacement, the lateral displacement and the yaw angle, includes sub-steps of:

smoothing out noises of the angular velocity data and the acceleration data using Kalman filtering process;

estimating a yaw rate and a lateral acceleration value based on the smoothed angular velocity data and the smoothed acceleration data by means of Kalman estimations;

estimating the lateral displacement and the yaw angle based on the yaw rate, the lateral acceleration value and the unit of time; and estimating the longitudinal displacement based on the linear velocity data, the yaw angle and the unit of time.

9. A trajectory planning method to be implemented by a driver assistance system installed on a vehicle, the driver assistance system including a lane detection module, an inertial measurement unit (IMU), a lane change assist (LCA) system and a processing unit, the trajectory planning method comprising steps of:

obtaining, by the lane detection module, lane-line data that relates to lane lines of a road on which the vehicle is running;

obtaining, by the IMU, kinematics data that relates to motion of the vehicle;

generating, by the LCA system, a preliminary lane change trajectory at a current time point;

calculating, by the processing unit, a current position of a reference point of the vehicle on the preliminary lane change trajectory at the current time point based on the lane-line data received from the lane detection module at the current time point;

based on the kinematics data received from the IMU at the current time, calculating, by the processing unit, a longitudinal displacement and a lateral displacement of the reference point of the vehicle moving during a unit of time from the current time point to a next time point, and a yaw angle of the vehicle at the next time point; and obtaining, by the processing unit, a calibrated lane change trajectory based on the preliminary lane change trajectory, the current position, the longitudinal displacement, the lateral displacement and the yaw angle, wherein the calibrated lane change trajectory starts from an estimated position, at which the reference point of the vehicle is estimated to be located the next time point.

10. A driver assistance system configured to be installed on a vehicle, comprising:

a lane detection module configured to obtain lane-line data that relates to lane lines of a road on which the vehicle is running;

an inertial measurement unit (IMU) configured to obtain kinematics data that relates to motion of the vehicle;

a lane change assist (LCA) system configured to generate a preliminary lane change trajectory; and a processing unit electrically connected to the lane detection module, the IMU and the LCA system, and configured, in response to receipt of the preliminary lane change trajectory from the LCA system at a current time point, to calculate a current position of a reference point of the vehicle on the preliminary lane change trajectory at the current time point based on the lane-line data received from the lane detection module at the current time point, based on the kinematics data received from the IMU at the current time, calculate a longitudinal displacement and a lateral displacement of the reference point of the vehicle moving during a unit of time from the current time point to a next time point, and a yaw angle of the vehicle at the next time point, and obtain a calibrated lane change trajectory based on the preliminary lane change trajectory, the current position, the longitudinal displacement, the lateral displacement and the yaw angle, wherein the calibrated lane change trajectory starts from an estimated position, at which the reference point of the vehicle is estimated to be located the next time point.

* * * * *